(No Model.)

J. R. WILLIAMS.
CIGAR BUNCHING MACHINE.

No. 382,449. Patented May 8, 1888.

WITNESSES:
S. R. Ellison
W. A. C. Matthis

INVENTOR:
John R. Williams,
BY Chas. O. Gill ATTY (No Model.) 7 Sheets—Sheet 2.

J. R. WILLIAMS.
CIGAR BUNCHING MACHINE.

No. 382,449. Patented May 8, 1888.

WITNESSES:
S. R. Ellison
W. A. C. Matthis

INVENTOR:
John R. Williams
BY Chas. C. Gill ATTY (No Model.)  7 Sheets—Sheet 3.

J. R. WILLIAMS.
CIGAR BUNCHING MACHINE.

No. 382,449.  Patented May 8, 1888.

WITNESSES:
S. R. Ellison
W. A. C. Matthie

INVENTOR:
John R. Williams,
BY Chas. C. Gill ATTY.

(No Model.)  
7 Sheets—Sheet 4.
J. R. WILLIAMS.
CIGAR BUNCHING MACHINE.
No. 382,449. Patented May 8, 1888.
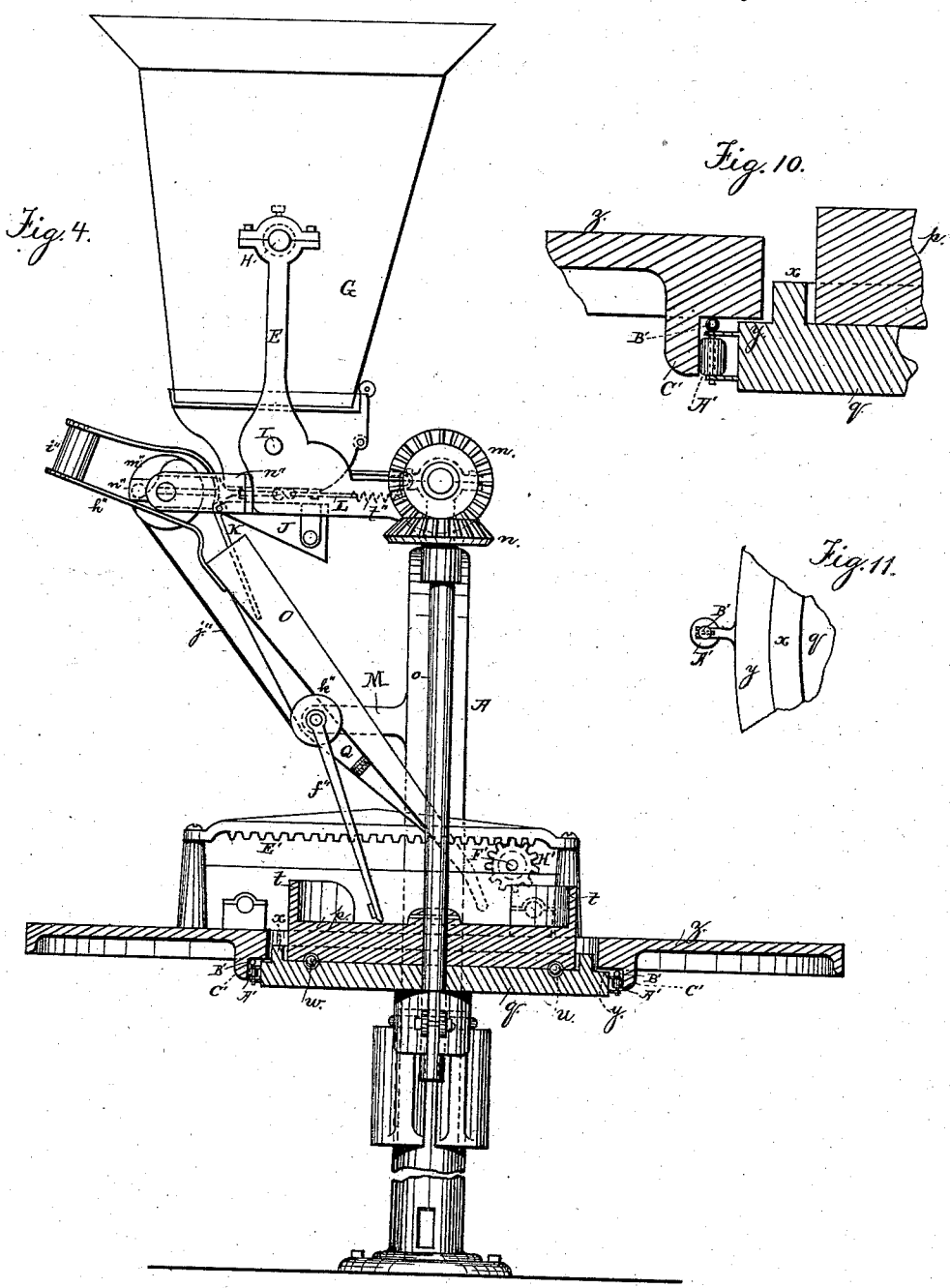
WITNESSES:
INVENTOR:
John R. Williams,
BY Chas. E. Gill ATTY.

(No Model.)   7 Sheets—Sheet 5.
J. R. WILLIAMS.
CIGAR BUNCHING MACHINE.
No. 382,449.   Patented May 8, 1888.
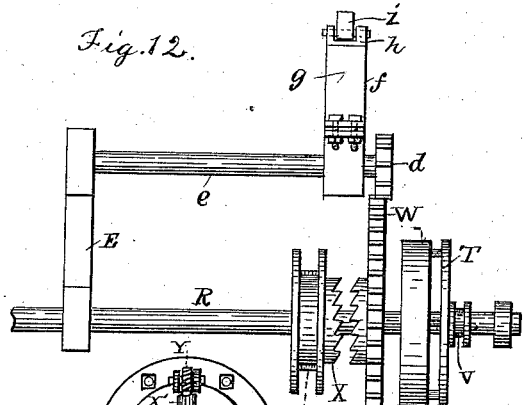
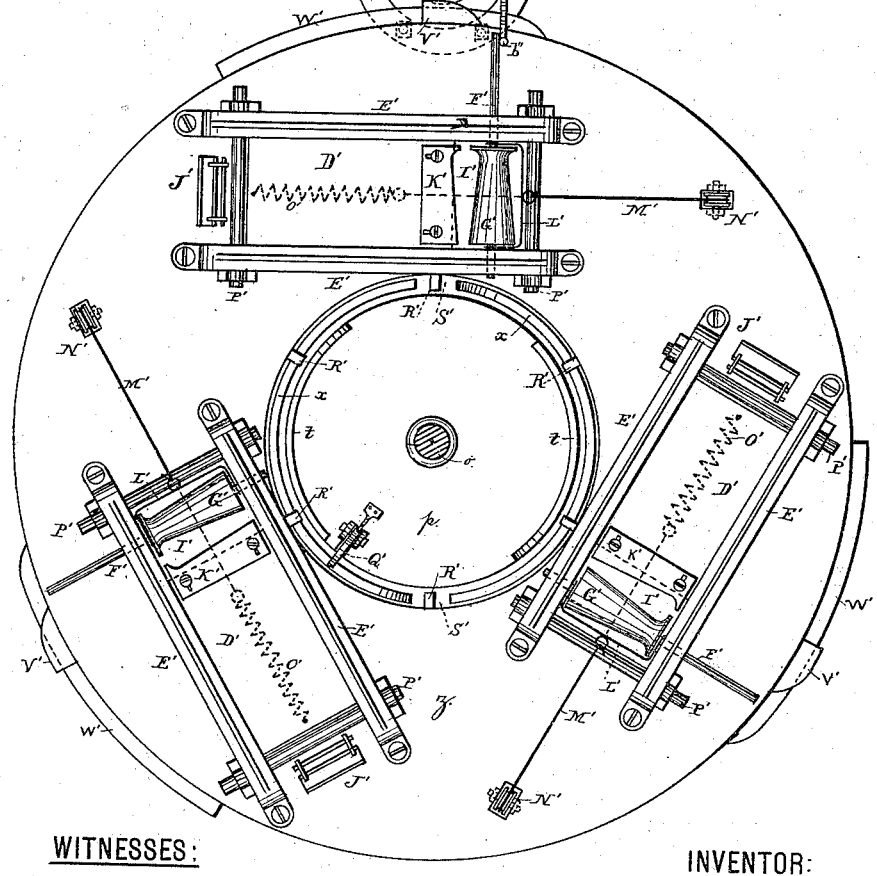
WITNESSES:
S. R. Ellison
W. A. C. Matthie
INVENTOR:
John R. Williams
BY Chas. C. Gill ATTY.

(No Model.)

J. R. WILLIAMS.
CIGAR BUNCHING MACHINE.

No. 382,449.

7 Sheets—Sheet 6.

Patented May 8, 1888.

WITNESSES:
S. R. Ellison
W. A. C. Matthis

INVENTOR:
John R. Williams
BY Chas. O. Gill ATTY (No Model.) 7 Sheets—Sheet 7.
J. R. WILLIAMS.
CIGAR BUNCHING MACHINE.
No. 382,449. Patented May 8, 1888.

WITNESSES:
S. R. Ellison
W. A. C. Matthis

INVENTOR:
John R. Williams,
BY Chas. C. Gill ATTY

UNITED STATES PATENT OFFICE.

JOHN R. WILLIAMS, OF NEWARK, NEW JERSEY, ASSIGNOR TO THE JOHN R. WILLIAMS COMPANY, OF NEW YORK, N. Y.

CIGAR-BUNCHING MACHINE.

SPECIFICATION forming part of Letters Patent No. 382,449, dated May 8, 1888.

Application filed December 28, 1887. Serial No. 259,199. (No model.)

*To all whom it may concern:*

Be it known that I, JOHN R. WILLIAMS, a citizen of the United States, and a resident of Newark, in the county of Essex and State of New Jersey, have invented certain new and useful Improvements in Cigar-Bunching Machines, of which the following is a specification.

The invention relates to improvements in machines for making cigars, and particularly to what are styled "cigar-bunching machines;" and it consists in certain elements of construction, hereinafter described and claimed, whereby cigar-bunches may be rapidly manufactured by steam-power.

The invention will be fully understood from the detailed description hereinafter presented, reference being had to the accompanying drawings, in which—

Figure 1:
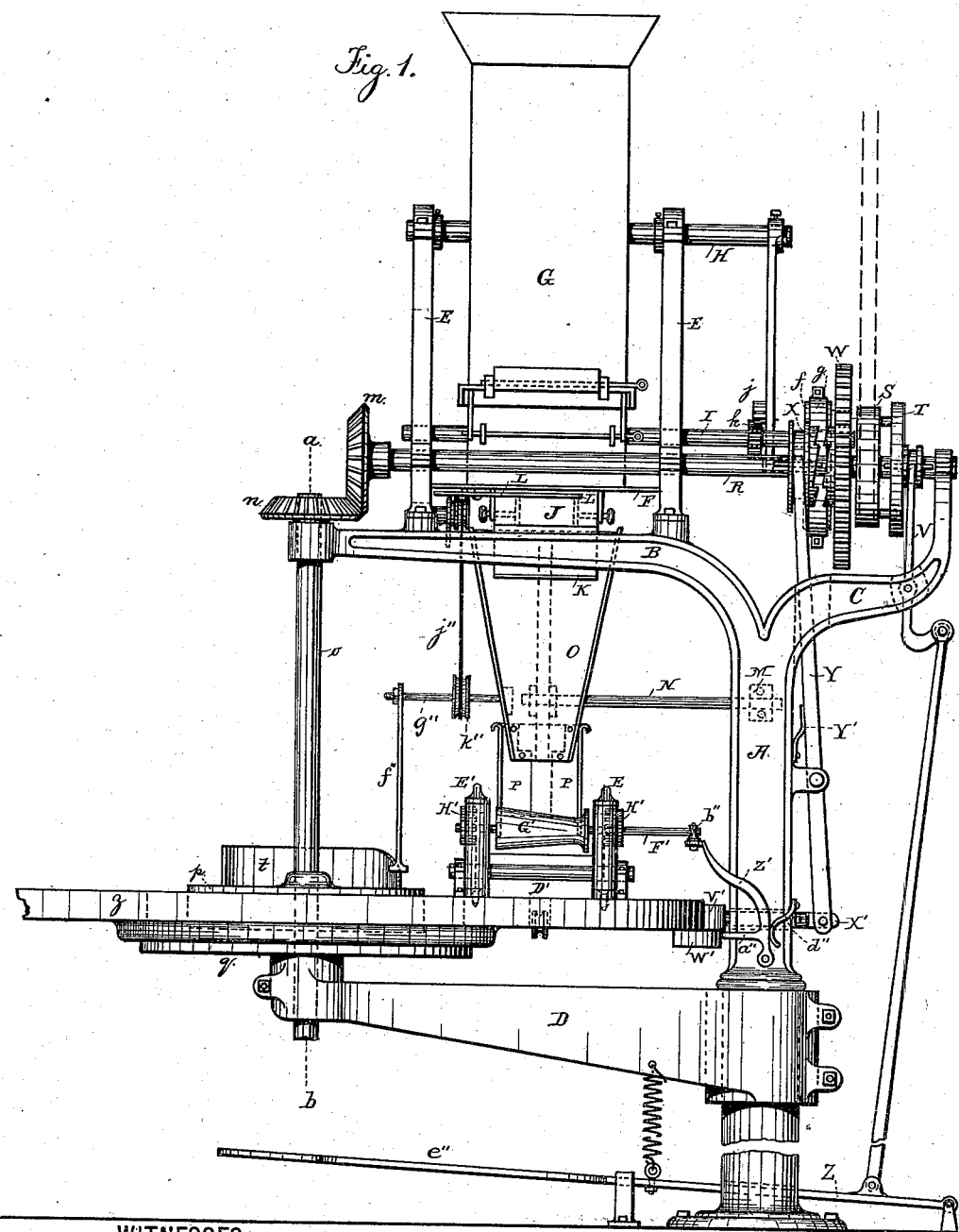
Figure 2:
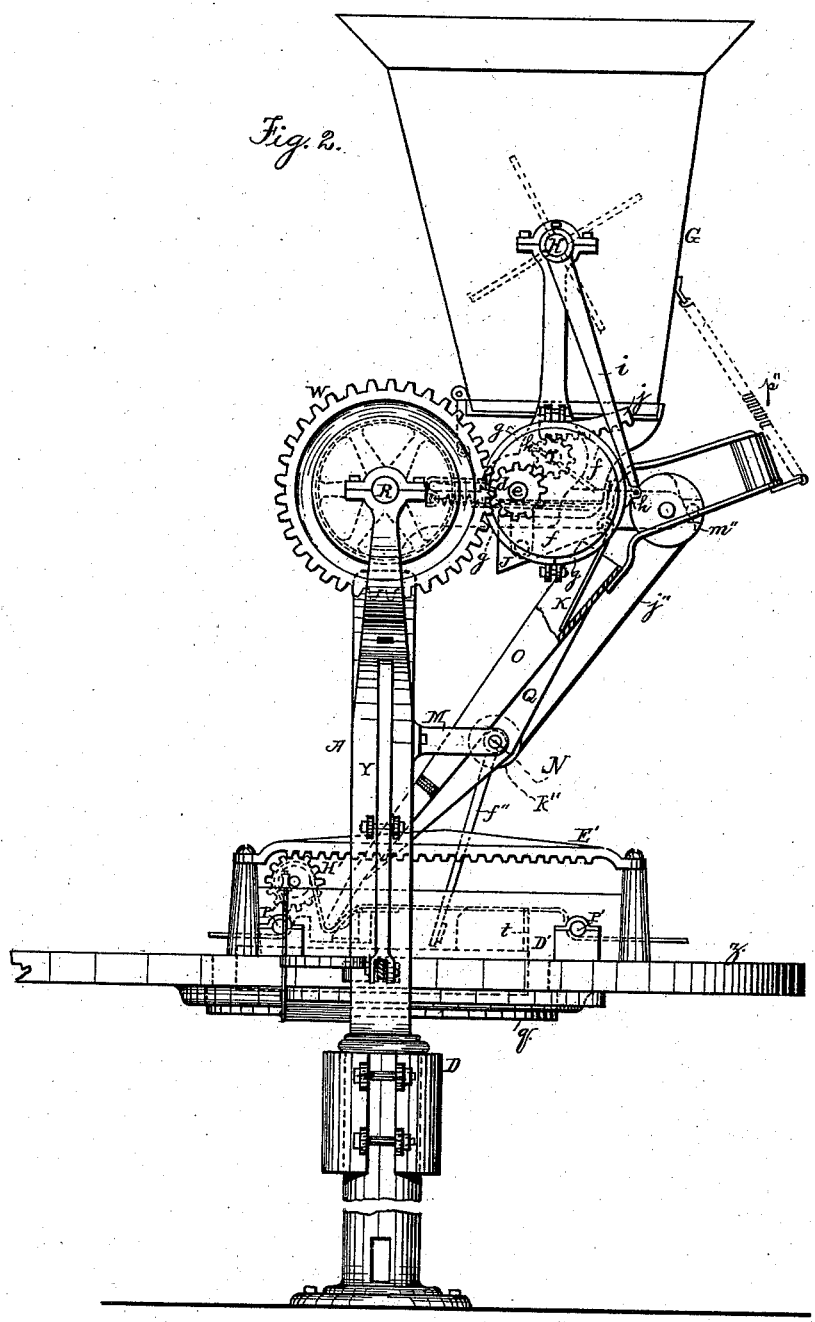
Figure 3:
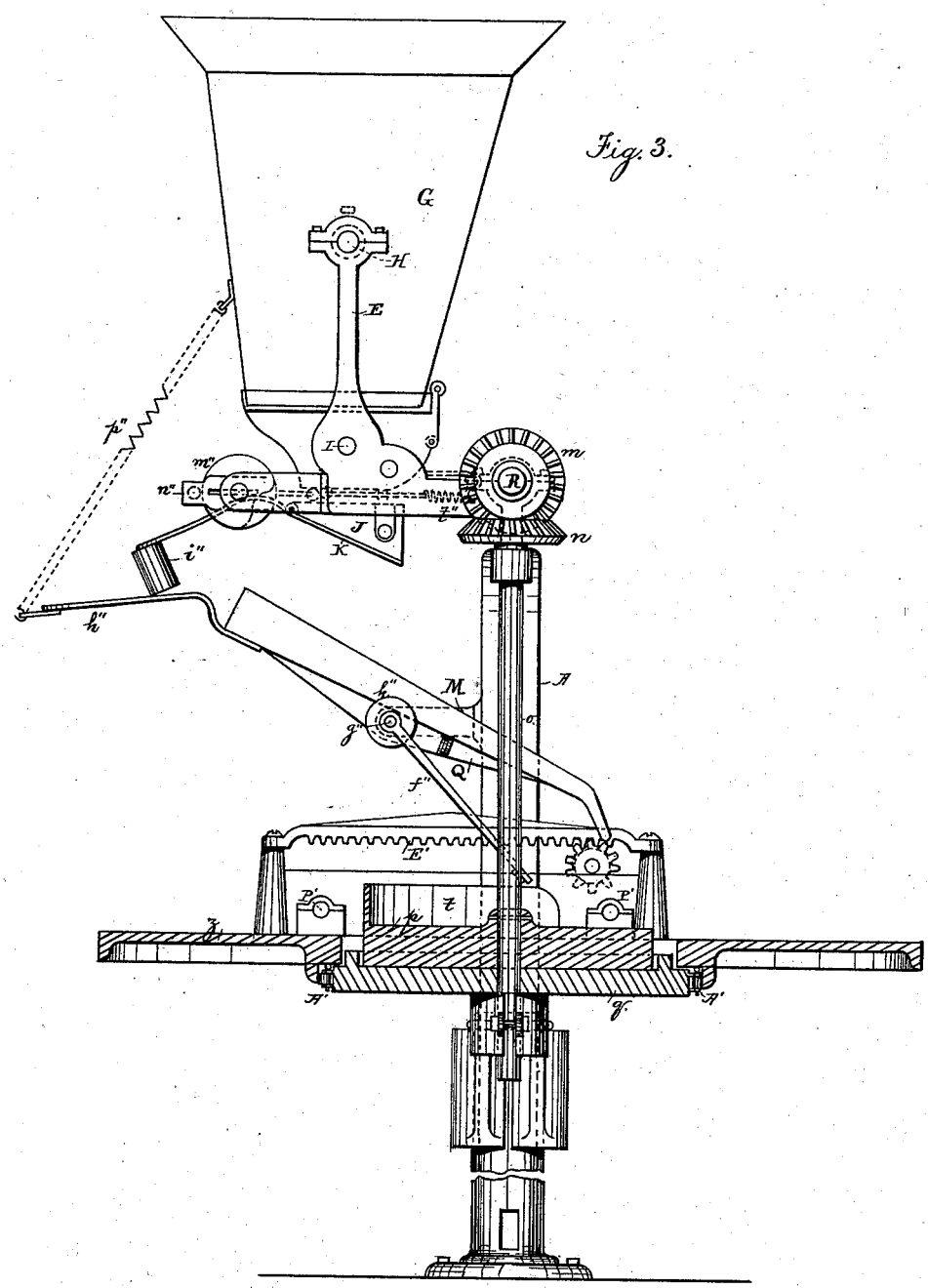
Figure 6:
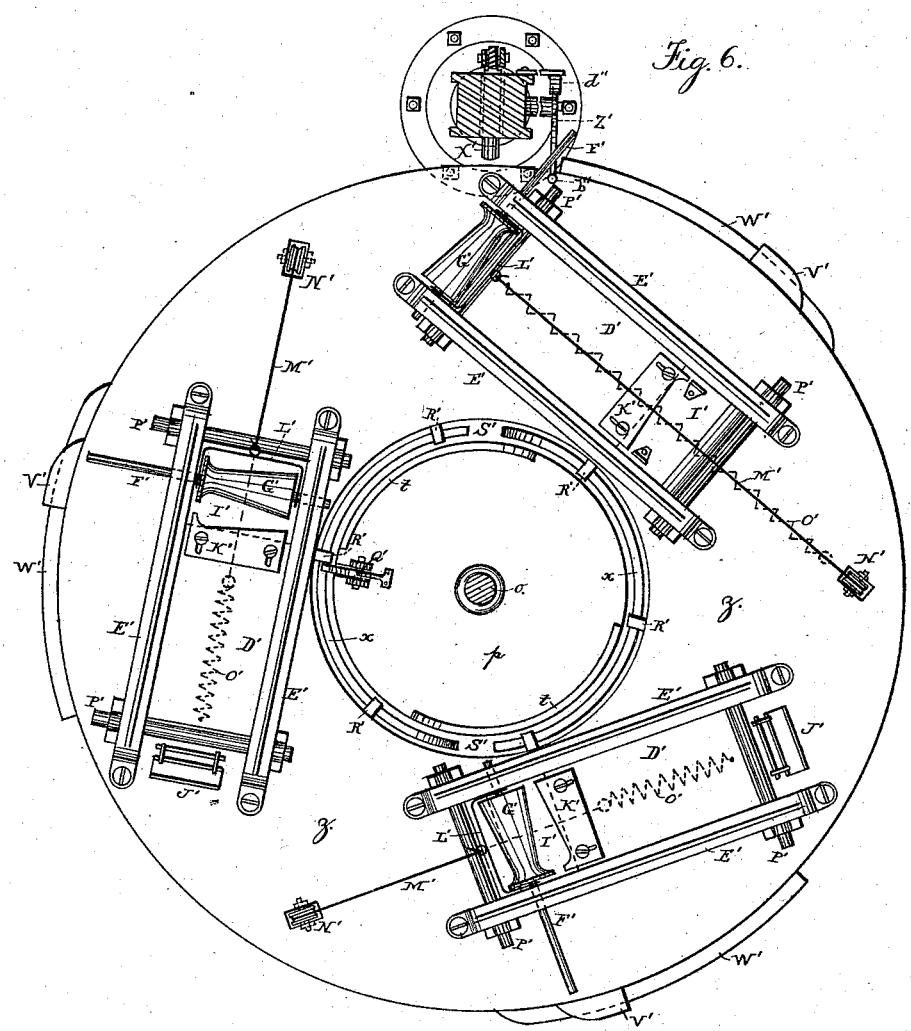
Figure 7:
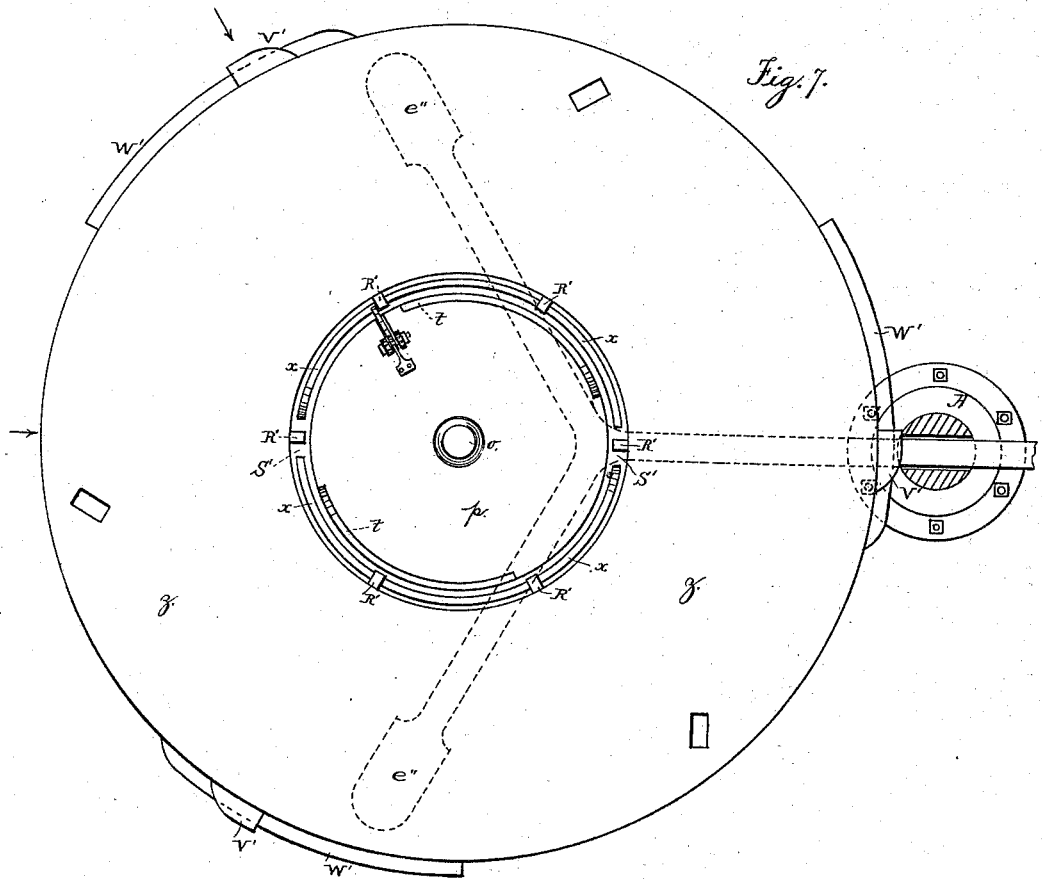
Figure 8:
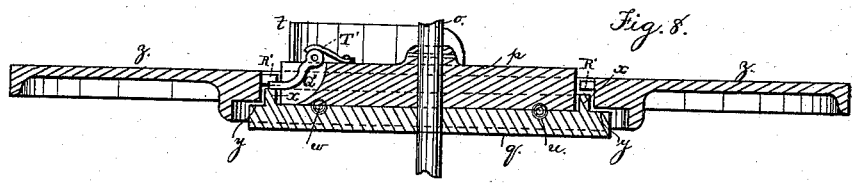
Figure 9:
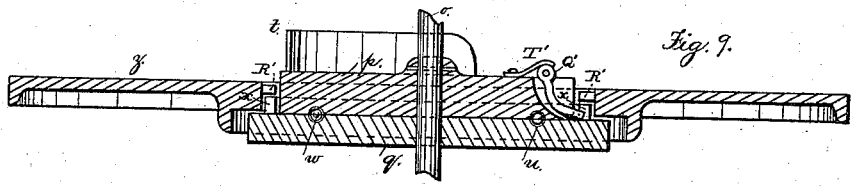

Figure 1 is a front elevation of a machine embodying the elements of the invention. Fig. 2 is an elevation looking at the right-hand end of the machine as illustrated in Fig. 1. Fig. 3 is a view, partly in section, looking at the left-hand end of the machine as illustrated in Fig. 1, the section being on the dotted line *a b* of Fig. 1. Fig. 4 is a similar view to Fig. 3, the movable chute between the rolling-table and the hopper for holding the filler-tobacco being shown in its lower position in Fig. 4, while in Fig. 3 it is illustrated in its upper position. Fig. 5 is a top view of the revolving dial carrying the series of rolling-tables, the position of the dial being that when one of the rolling-tables is in position to receive a charge of filler-tobacco from the elevated receptacle. Fig. 6 is a similar view to Fig. 5, with the exception that its position illustrates the said rolling-table as having passed beyond the chute conveying the tobacco downward from the elevated receptacle and the roller of said table as having been moved to the rear end thereof, which will be its position when the bunch has been rolled from the rear end of said table into the usual bunch-receiver. Fig. 7 is a top view of the revolving dial for carrying the series of rolling-tables, the tables in this view being omitted and the dotted lines illustrating the foot-treadle for starting or stopping the motion of the machine. Fig. 8 is a central vertical section of the revolving dial for carrying the rolling-tables. Fig. 9 is a like view of same, illustrating the movable parts in a different position, as hereinafter explained. Fig. 10 is an enlarged detached sectional view of the contact parts of the revolving dial and its supporting plates, hereinafter described. Fig. 11 is a detached top view of one edge of the supporting-plate for the revolving dial, this view being presented merely to illustrate the roller upon which the said dial moves, as hereinafter described; and Fig. 12 is a detached top view of the mechanism situated at and in communication with the right-hand end of the power shaft.

In the drawings, A designates the supporting standard for the machine, said standard having the lateral arms B C and being provided with the horizontal supporting-arm D. Upon the arm B are applied the standards E E, between which is supported, upon the plate F, (see Fig. 1,) the receptacle G for the filler-tobacco. In the standards E E are journaled the horizontal shafts H I, respectively, which extend through the receptacle G and carry within the same suitable pins for agitating and feeding downward the filler-tobacco. The shafts H I, carrying the pins, are the same as the similar elements described and claimed in Letters Patent of the United States granted to me for improvements in cigar-bunching machines, dated April 8, 1879, and September 6, 1887, and in consequence of which said shafts, with their fingers or pins, are not more particularly described herein. The receptacle G is also described in the aforesaid Letters Patent, and is not separately made the subject of a claim herein.

In the lower end of the receptacle G is provided the usual aperture, and suspended below the same is illustrated the well-known charge-box J, having the door K at its bottom, and being supplied between its upper edge and the lower end of the receptacle G with the cut-off plate or valve L. The charge-box J, with its door, and the cut-off plate or valve L, are also illustrated in the Letters Patent aforesaid, and their operation and use are now well known.

Upon the rear side of the standard A is applied the bracket M, (shown in Figs. 2 and 3,) to which is affixed the horizontal arm N, having journaled upon its outer end the chute O, by which the filler-tobacco is conveyed from the receptacle G and charge-box J to the rolling-aprons, hereinafter described. The lower end of the chute O is provided with the laterally-hinged wings P, in order to adjust the chute for the manufacture of cigars varying in length. Upon the rear side of the chute O is secured the fin Q, (shown in Figs. 2 and 4 by full lines and in Fig. 1 by dotted lines,) which affords a suitable means by which the end of the arm N may be journaled with the chute O, the latter being retained on the arm by nuts, one on each side of the fin, as shown by dotted lines.

The power shaft is designated by the letter R, and is journaled in the standards E E, as shown in Fig. 1. The right-hand end of the power-shaft R is provided with the loose band-wheel S, adapted to receive a driving-belt, as shown by dotted lines in Fig. 1, and which is used in connection with the clutch T, which is feathered upon the shaft R, and is adapted to be moved thereon by means of the pivoted rod V. Upon the shaft R, immediately at the left of the band-wheel S, is loosely mounted the spur gear-wheel W, carrying at its center one portion of a clutch, the other portion (lettered X) being feathered upon the shaft R and adapted to be moved thereon by the pivoted rod Y, so as to engage that portion of the clutch which is rigid with the gear-wheel W, or to be disconnected therefrom. When the clutch T is in engagement with the band-wheel S, the motion of the wheel will be imparted through the clutch to the shaft R, and when the clutch T is not engaged with the wheel S the motion of the latter will not affect the shaft R. During the revolution of the shaft R movement may be communicated to the wheel W by the engagement of the clutch X therewith.

In Fig. 1 the clutch X is shown disengaged from the gear-wheel W, and when the mechanism is in this position the wheel W will remain idle. The clutch T will be thrown into engagement with the band-wheel S at the proper time by the ordinary foot-treadle, Z, and the clutch X will be moved to engage the gear-wheel W during the operation of the machine by a cam, hereinafter described, actuating at regular intervals the rod Y, as illustrated in Fig. 1.

The gear-wheel W engages at all times the pinion d, which is rigidly mounted on the shaft e, upon which, at the left of the pinion d, is rigidly mounted the eccentric f, (shown more clearly in Fig. 2,) which is encompassed by the loose band g, having at the rear side of the wheel the shoe h, in which is pivoted the lower end of the rocking arm i, the upper end of the arm being rigidly secured to the upper feed-shaft, H.

Upon the arm i is rigidly secured the toothed segment j, as shown in Figs. 1 and 2, and which engages the pinion k, mounted upon the lower feed-shaft, I. When the clutch X engages the gear-wheel W, and the gear-wheel is thus caused to revolve, its movement is communicated through the pinion d to the shaft e, and this operates to rotate the eccentric f, which (the band g being loose thereon) operates to rock the arm i backward and forward, whereby there is communicated to the shaft H and the agitator-pins thereon a rocking movement in the receptacle G, and whereby, also, the toothed segment j is given a frontward and backward movement over the pinion k, which, rotating, imparts a revolving movement to the shaft I and agitator-pins thereon in the receptacle G. Thus during this movement the tobacco in the receptacle is agitated and caused to feed downward toward the charge-box J, hereinbefore referred to.

Upon the left-hand end of the power-shaft R is secured the beveled gear-wheel m, which engages the beveled gear-wheel n, secured upon the upper end of the vertical shaft o, (see Fig. 1,) which passes downward through the revolving disk p and base plate q, and is journaled in the upper end of the arm D. The disk p revolves with the shaft o, while the plate q remains stationary upon the hub formed upon the outer end of the arm D. Upon the disk p is provided at regular intervals the vertical flange t, which operates through suitable mechanism, hereinafter described, to open and close the cut-off plate or valve L, located between the charge-box J and the lower end of the receptacle G, as hereinafter described.

Upon the base-plate q is provided the annular groove u, corresponding with a similar groove in the bottom of the disk p, and in these grooves, as shown in Fig. 4, may be retained small rollers or balls w, by which to facilitate the rotary movement of the disk upon the plate q. Upon the plate q are also provided the annular vertical flanges or shoulders x, which embrace the lower outer edges of the disk p and form beyond it the shoulder y, upon which rest the inner edges of the revolving dial z, suitable friction-wheels, A' and B', being provided, as shown in Figs. 4 and 10, to facilitate the movement of the dial during the operation of the machine. The friction-wheels A' and B' are arranged so that the former is in contact with the vertical flange C' of said dial, while the friction-wheel B' is on a different axis, and is in contact with the lower surface of the inner edges of the dial.

The central portions of the dial z are removed, so that the dial may be inserted over and rest upon the shoulder y, formed around the outer edges of the base-plate q, and said dial has formed upon or secured to its upper surface the rolling-tables D', (see Figs. 1, 5, and 6,) arranged at regular distances apart, and each having upon opposite sides the inverted racks E', forming a guideway for the shaft F' of the roller G', for forming the bunch, the shaft F' of each rolling-table being provided with pinions H', (shown more clearly in Fig. 1,) which engage the inverted racks E' and prevent any unequal movement in the opposite ends of the shaft F' or roller G' during the operation of rolling the bunch.

In each of the tables D' there is provided at the front end thereof a recess or mold, I', and at the rear end of each of said tables is arranged the usual bunch-receiver, J'. Upon the tables D', immediately at the rear of the molds I', are provided the forming-plates K', which are fully described and made an essential element of the invention embodied in my application for Letters Patent of the United States filed on the 14th day of November, 1887, and bearing Serial No. 255,048. Upon each shaft F' of the reciprocating rollers G' is secured the arm L', (see Fig. 5,) to which is secured one end of the cord M', the other end thereof passing around the pulley N' and extending beneath the rolling-tables D', where the said cord is connected with the coiled spring O', (illustrated by dotted lines,) and the purpose of which spring is to create a tension on the shafts F', so as to return them to the front end of the rolling-tables D', which is their position (illustrated in Fig. 5) after they have been moved to the rear end of the same, in the manner hereinafter described, for the purpose of rolling the bunches.

Upon each of the tables D' will be applied a stationary rolling-apron, (shown in Fig. 2,) the ends thereof being clamped beneath the rods P', in the manner indicated in my application for Letters Patent aforesaid.

The revolving motion of the disk $p$ is continuous with that of the power-shaft R, and the dial $z$, carrying the rolling-tables D', has an intermittent motion communicated to it from the disk $p$, while the base-plate $q$ remains stationary. The dial $z$ actuates, as hereinafter described, the feed shafts within the receptacle G, and also serves to set in motion, in the manner hereinafter specified, the rollers G', for rolling the bunch. Upon the disk $p$ is pivoted the arm Q', as shown in Figs. 5, 6, 7, 8, and 9, the end of which arm protrudes beyond the edge of the disk and extends over and moves upon the vertical flanges $x$. The dial $z$ has upon its inner edge a series of projections, R', which also extend over and move upon the said vertical flanges $x$, which are two in number and separated from each other by spaces, (lettered S',) as illustrated in the drawings. The purpose of the pivoted arm Q' is to impart movement at the proper time to the revolving dial $z$.

In Fig. 5 the rolling-table D' beneath the chute O is in position to receive a charge of tobacco for a bunch, and at this time the dial $z$ is stationary. The motion of the disk $p$ being continuous, the arm Q' will during the continued revolution of the disk come into contact with the projection or shoulder R' nearest to it (see Fig. 5) and operate by the continued pressure on said shoulder to revolve the dial $z$ until the arm Q' has reached the end of the flange $x$ and fallen into the space S', at which time the dial, being relieved of pressure, will cease to revolve. When the end of the arm Q' falls into the space S', it will attain a lower plane than the projection R', located above said space; hence during the continued motion of the disk $p$ the arm Q' will move beneath the said projection R' and ascend the adjacent edge of the vertical flange $x$ and travel along the same until it comes into contact with an additional projection R', when it will again cause the dial $z$ to have a partial revolution, this movement ceasing as soon as the arm Q' reaches another space S', when it will descend below said projection R' and allow the dial to remain at rest until it has ascended the first vertical flange $x$ again and is brought into contact with an additional projection R', when the same movement will result as before. The purpose of giving this intermittent movement to the dial $z$ is to afford sufficient time for the charge of filler-tobacco to fall into the pocket of the apron (shown in Fig. 2) on the table D' beneath the chute, and also to afford time for the operators to place a binder upon the apron next in succession to assume a position beneath the chute O and to remove the finished bunch from the receiver J'.

In Fig. 8 I illustrate the arm Q' in position upon the flange $x$ and in contact with the projection R', while in Fig. 9 the opposite condition is illustrated, the arm in this view being illustrated as having fallen into one of the spaces S' on a lower plane than the said projection R'. The arm Q', being secured loosely upon a pivot, will of its own weight fall into the space S' at the proper time; but in order to insure a quick downward movement of the arm Q', I have provided a small spring, T', (see Figs. 8 and 9,) which creates a downward tension on the said arm, keeping it upon the flange $x$, and causing it, after leaving the same, to at once fall below the plane of the projections R'. Upon the outer edges of the dial $z$, at points opposite to the rolling-tables D', are arranged the cams lettered V' W', respectively, the former of which, during the movement of the dial $z$, presses the rod X', and with it the lower end of the vertical rod Y, outward, thereby relieving the clutch X from contact with the spur gear-wheel W, the effect being to cut off the motion of the power-shaft from the pinion $d$, whereby the feed-shafts will remain idle. After the cams V' have passed from the rod X', the spring Y' will force the rod Y back to its former position, thus bringing the clutch X into contact with the wheel W, whereby communication between the power-shaft R' and the pinion $d$ will be re-established. The cam W' is on a lower plane than the cam V', and said cam is adapted during the revolution of the dial $z$ to come into contact with the arm $a''$ of the spring-rod Z', the upper end of which extends over the edge of the dial and carries a vertical roller, $b''$, which, during the movement of the dial $z$, comes into contact with the outer end of the shaft F' of the forming-rollers G', as illustrated in Fig. 1, and the purpose of this arrangement is to cause the arm Z′ to effect the movement of the shaft F′ and forming-roller G′ the whole length of the rolling-table D′ whenever the cam W′ throws the rod Z′ upward into position.

It will be noted upon an inspection of Fig. 5 that while the upper rolling-table D′ is in position beneath the chute O the rod Z′ is in contact with the shaft F′, while said shaft is at the front end of the rolling-table. After the tobacco has fallen into the pocket from the chute O, the motion of the dial $z$ continuing, the rod Z′ will retain the shaft F′ and roller G′, while during the continued motion of the dial the table D′ is carried along, the bunch during this part of the movement being rolled and the roller G′ remaining practically stationary, while the table moves. After the table D′ has moved along until the shaft F′ reaches the rear ends of the inverted racks E′, the cam W′ will cease to act upon the arm $a''$ of the rod Z′, and at this time the spring $d''$ will depress the rod Z′ and relieve it from contact with the shaft F′, thereby permitting the dial $z$ to continue its movement and the spring O′ to retract the roller G′ to its position at the front end of the inverted racks E′, as illustrated at the right-hand side of Fig. 5.

In Fig. 5 the upper rolling-table is shown, as aforesaid, in position to receive a charge of filler-tobacco from the chute O, and the rod Z′ is shown in contact with the shaft F′, the latter being at the front end of the inverted racks E′, this being the initial position of the parts preparatory to rolling the bunch, as above described, while in Fig. 6 the rolling-table is illustrated in its second position, having passed beyond the chute O, the rod Z′ having retained the shaft F′ and the roller G′ until the rear ends of the inverted racks E′ reached the same and the bunch rolled from the table into the usual receiver, J′. The attendant sitting opposite to the table D′ at the lower part of Fig. 6 will remove the finished bunch from the receiver J′, and the attendant sitting opposite to the table D′ at the left-hand side of Fig. 6 will place upon the apron a proper binder to receive the tobacco as soon as the table shall have passed beneath the chute O, this being the position illustrated in the upper part of Fig. 5. The treadle for stopping and starting the machine will be provided with two arms, $e''$, as illustrated by dotted lines in Fig. 7, in order that either of the attendants may stop the motion should it be necessary.

The chute O, as aforesaid, is hung upon the outer end of the rigid rod N, and this chute has a hinged or rocking movement imparted to it at regular intervals by the vertical flanges or cams $t$ through the medium of the arm $f''$ and rod $g''$, which are rigidly connected with each other and (at the inner end of the rod $g''$) with the chute O at a point below the rod N. The vertical cams or flanges $t$ are two in number and secured to or made to form a part of the disk $p$, as shown in Figs. 4, 5, 6, and 7.

During the revolution of the disk $p$ the vertical flanges or cams $t$ are successively brought into contact with the lower end of the arm $f''$ and operate, as illustrated in Fig. 3, to force the rod forward, thereby turning the chute O upward on the rod N, as illustrated in Fig. 3, at which time, the extension $h''$ on the chute being lowered from the weight $i''$, secured to the rear extension of the door K, said door will close against the box J. At this point in the operation of the machine the cut-off valve L will be opened by reason of the cord $j''$ being wound upon the wheel $k''$ during the rotary movement of the arm $g''$, attached to the chute O. The cord $j''$ is secured at its upper end to the cam-wheel $m''$, which actuates the plate $n''$ to open the cut-off valve L, in order to permit an additional supply of the filler-tobacco to enter the charge-box J. After the vertical flanges or cams $t$ have passed the lower end of the arm $f''$, the spring $p''$ will retract the chute O to its former position, being that illustrated in Fig. 4, thus causing the extension $h''$ on the chute to elevate the weight $i''$ and open the door K of the box J, permitting thereby the tobacco in the box to slide down the chute to the rolling-tables. During the downward movement of the chute O to the position illustrated in Figs. 1, 2, and 4 the cord $j''$ will be unwound from the wheel $k''$, thereby relieving the cam-wheel $m''$ and permitting the spring $t''$ (shown by dotted lines in Fig. 4) to retract the plate $n''$ and close the cut-off valve L, thereby preventing any undue quantity of the tobacco from falling from the receptacle G through the box J when the door thereof (lettered K) is open. The cam $m''$, with the plate $n''$, cord $j''$, spring $t''$, and cut-off valve L, are shown and described in my application for Letters Patent hereinbefore referred to, filed November 14, 1887.

From the foregoing description it will be observed that the rotation of the power-shaft and that of the disk $p$ is continuous, that the rotation of the dial $z$ is intermittent, motion being imparted to it from the disk $p$, and that the rotation of the feed-shafts H I is intermittent, power being applied to and cut off from the same by the cam V′ acting on the rocking lever Y, which is connected with the chute O. The chute O has an intermittent rocking motion, owing to the fact that the vertical flanges $t$ do not extend entirely around the disk $p$. The chute O is turned upward during the rolling of the bunch, and thereafter falls downward into the position illustrated in Fig. 4, in order to convey the tobacco from the charge-box J to the next succeeding rolling-table which has come below the same. When the chute O is down, as shown in Fig. 4, the door K at the bottom of the charge-box will be open and the valve-plate L closed. Thus it will be seen that only the tobacco previously in the charge-box can descend to the rolling-table. When the chute O has been turned upward, the door K will close and the valve-plate L open, thereby admitting tobacco to said box for the formation of another bunch. The opening and closing of the valve-plate L is timed with the movement of the chute O through the medium of the wheel $k''$ and cord $j''$, whereby when the chute is elevated the door K will close, and when the chute is depressed the door will open and permit the contents of the box J to pass down the chute.

I hereby disclaim in favor of my application for patent for improvements in cigar-bunching machines filed November 14, 1887, and bearing Serial No. 255,048, the elements hereinbefore described as the forming-plates K', the stationary aprons secured upon the tables by rods P', the cam $m''$, plate $n''$, cord J'', spring $t''$, and cut-off valve L, and whatever is shown, described, and not claimed in this application, but shown, described, and claimed in my said application filed November 14, 1887, is disclaimed.

What I claim as my invention, and desire to secure by Letters Patent, is—

1. The elevated receptacle for filler-tobacco, containing feed mechanism and the chute for conveying the charges of tobacco therefrom, combined with the rotating dial having an intermittent motion and carrying a series of rolling-tables, the reciprocating rollers for said tables, the rotary disk within said dial, connections between said disk and dial, whereby motion may be communicated from one to the other, and mechanism, substantially as described, for applying power, substantially as set forth.

2. The elevated receptacle for filler-tobacco and the movable chute for conveying the charges of tobacco therefrom, in combination with the rotary dial carrying the series of rolling-tables and rollers, the disk within the said dial, the series of projections R', connected with said dial, the arm Z', connected with said disk, and the arm adapted to engage the shafts of said rollers during the revolution of the dial, substantially as set forth.

3. The elevated receptacle for filler-tobacco and the movable chute for conveying the charges of tobacco therefrom, in combination with the rotary dial carrying the series of rolling-tables and rollers, the disk within said dial carrying the flanges $t$, and the arms $f''$ and $g''$, for turning said chute upward at intervals, substantially as set forth.

4. The elevated receptacle for filler-tobacco and the movable chute for conveying the charges of tobacco therefrom, in combination with the revolving dial having an intermittent movement and carrying the series of rolling-tables, the reciprocating rollers for each of said tables, and mechanism, substantially as described, for retaining the said rollers while the table is in motion, substantially as described.

5. The elevated receptacle for filler-tobacco and the movable chute for conveying the charges of tobacco therefrom, in combination with the revolving dial having an intermittent movement and carrying the series of rolling-tables, the reciprocating roller for said tables, an arm for retaining the said roller while the table is in motion, and mechanism, substantially as described, for retracting the said roller to the front end of the table after the bunch has been rolled, substantially as set forth.

6. The elevated receptacle having an intermittent feed and the movable chute for conveying the charges of the filler-tobacco therefrom, in combination with the revolving dial having an intermittent motion and carrying the rolling-tables, the inverted toothed guides on opposite sides of said tables, the reciprocating roller with its shaft and pinions for each of said tables, and an arm for retaining the said roller while the table is in motion, substantially as set forth.

7. The elevated receptacle having an intermittent feed and the movable chute for conveying the charges of tobacco therefrom, in combination with the revolving dial carrying the rolling-tables and reciprocating rollers, the arm for retaining said rollers in succession while the table is in motion, a cam for actuating said rod, an additional cam on the dial, and intermediate mechanism, as described, for controlling the feed, substantially as set forth.

Signed at New York, in the county of New York and State of New York, this 21st day of December, A. D. 1887.

JNO. R. WILLIAMS.

Witnesses:
CHAS. C. GILL,
W. A. C. MATTHIE.